United States Patent [19]

Harley et al.

[11] 4,356,787
[45] Nov. 2, 1982

[54] FLOAT CONSTRUCTION

[76] Inventors: Richard C. Harley; Howard D. Harley, both of 685 E. Pearl St., Bartow, Fla. 33830

[21] Appl. No.: 865,843

[22] Filed: Dec. 30, 1977

[51] Int. Cl.³ .............................................. B63B 1/20
[52] U.S. Cl. ................................................... 114/292
[58] Field of Search ............... 114/289, 290, 291, 292, 114/62, 288; 9/310 A, 310 R; 441/68, 65

[56] References Cited

U.S. PATENT DOCUMENTS

| | | | |
|---|---|---|---|
| 1,644,725 | 10/1927 | Hickman | 114/288 |
| 1,886,507 | 11/1932 | Wehr | 114/288 |
| 2,172,674 | 9/1939 | Frost | 114/288 |
| 2,547,146 | 4/1951 | Anthony | 114/292 |
| 3,113,543 | 12/1963 | Brownback | 114/291 |
| 3,208,421 | 9/1965 | Landes et al. | 114/292 |

Primary Examiner—Trygve M. Blix
Assistant Examiner—Jesus D. Sotelo
Attorney, Agent, or Firm—Duckworth, Allen, Dyer & Pettis

[57] ABSTRACT

An improved float construction of the type primarily intended for use in supporting a seaplane and commonly referred to as a pontoon. More particularly, the present invention relates to an improved bottom configuration of a single step float.

12 Claims, 13 Drawing Figures

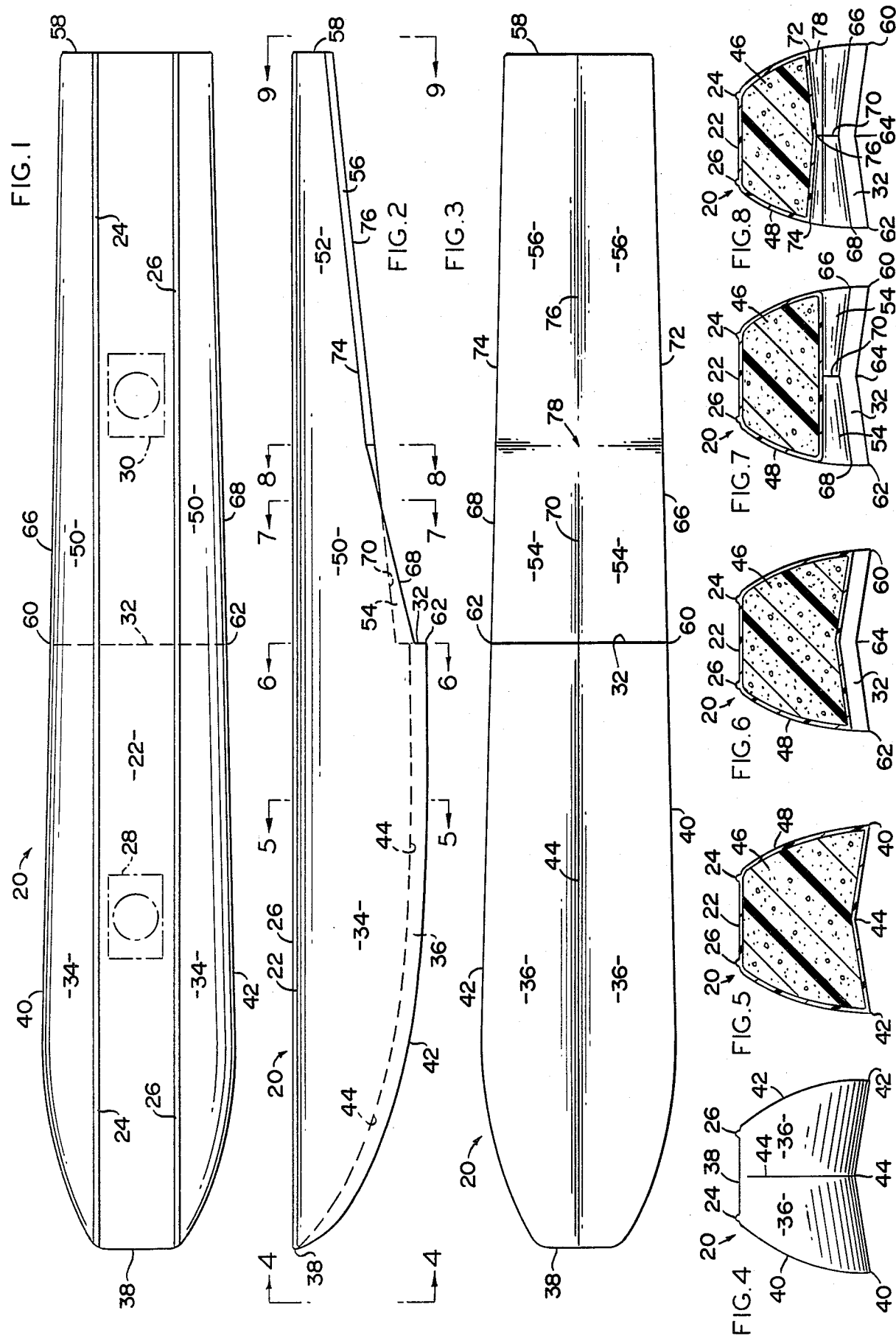

FLOAT CONSTRUCTION

BACKGROUND OF THE INVENTION

1. Field of the Invention

The present invention relates to a float construction of the type primarily intended for use in supporting a seaplane, and more particularly to improvements in the construction of the bottom of the float so as to enable an airplane equipped with the floats of this invention to take off in shorter distances than has heretofore been obtainable. The float, or pontoon, of the present invention is of the single step variety.

2. Description of the Prior Art

Numerous constructions for seaplane floats, or pontoons, are known in the prior art. With regard to these prior art devices it may be said that, first, the floats were designed for the sole purpose of supporting the plane on the surface of the water. As such, the earliest float constructions were mere flotation devices, and little consideration was given to their planning characteristics as they moved across the water's surface.

However, engineers and seaplane manufacturers soon realized that the planing characteristics of the float directly related to performance capabilities of the plane to which they were attached. That is to say, if better planing characteristics could be obtained, the seaplane could become airborn in shorter distances. This not only made the seaplanes safer, but also extended their capabilities with regard to landing and taking off on relatively smaller bodies of water. Accordingly, principles of marine engineering were applied to float constructions.

A significant advancement in the art of seaplane float construction was realized by the addition of a transverse step across the bottom of the float. Simultaneously, the front of the float was normally curved in an upward direction much like the bow of a boat. When an aircraft equipped with such prior art floats was at rests or being taxied, it tended to sit back on the step portion of the float and present an inclined bow so as to move through the water more easily. Then, as the aircraft approached the speed necessary to be airborn, the floats would tend to plane on the forward, bow portion, significantly reducing the water's drag with the corresponding increase in the plane's takeoff capabilities. Exemplar such prior art constructions are shown in U.S. Pat. Nos. 1,794,898; 1,812,265; and 3,208,421.

Notwithstanding the engineering advances discussed and illustrated above, the current state of the art for float constructions is still such that relatively large bodies of water are required for launching seaplanes because of the drag characteristics of the floats. Accordingly, it is clear that there is a great need in the art for an improved float construction which would significantly decrease the taxi distance of a seaplane prior to its being airborn. Of course, such an improved float construction should be of a type which can be easily installed and maintained on existing seaplanes. Furthermore, while the improved construction would have as one of its primary objects the reduction of drag as the plane moved across the water's surface, the construction must also be aerodynamically sound so as to have no deleterious effect on the plane's flight characteristics once it is airborn.

SUMMARY OF THE INVENTION

The present invention relates to a float construction of the type primarily intended for use in supporting a seaplane. However, it should be noted at this point that the float construction of the present invention is not limited to its utilization in combination with a seaplane. For example, the float construction of this invention may be utilized as a boat hull or an hydroski. In short, it is contemplated that the construction of the present invention may be utilized in virtually any environment wherein it is desirable to move some object efficiently across the surface of a liquid.

The float basically comprises a main body defining a longitudinal dimension which is greater than its width. Of course, inasmuch as the float will be utilized to support some object on the surface of a fluid, the main body must possess a density substantially less than that of the supporting fluid. Though not absolutely necessary, it is preferred that the main body be covered by a protective coating such as, for example, sheet metal or fiberglass, so as to provide a more durable device. In the preferred embodiment which will be discussed in greater detail below, it is furthermore desirable to include structural support members for the purpose of attaching the float to the struts of a seaplane.

A single transverse step is provided across the bottom of the float, and the float's bow portion extends forwardly from the step while the float's tail portion extends aft of the step.

The bow of the float curves upwardly from the step to its leading edge, and a similar configuration is defined by the tail from the step to its trailing edge. In order to enhance the planing effect of the float as it passes across the water's surface, the bow further comprises a substantially V-shaped configuration with the apex of the V defining the longitudinal dimension of the bow. The lower portion of the step is similarly configured.

The tail of the float is also uniquely configured so as to enhance the planing and lifting capabilities of the float. In order to accomplish this two basic embodiments for the tail of the float have been developed and will be described in greater detail below. In one embodiment the tail of the float comprises a substantially convex V-shaped configuration with the apex of the V defining the longitudinal dimension of the tail. In a second embodiment, the tail portion comprises first and second tail sections the bottoms of which are differently configured. In this second embodiment the bottom of the first tail section defines a substantially concave cross-section with regard to the major longitudinal dimension of the float. This concave cross-section comprises a substantially V-shaped configuration with the apex of the V defining the longitudinal dimension of the first tail section. The second tail section defines a substantially convex cross-section with regard to the major longitudinal dimension of the float. Again, this convex cross-section comprises a substantially V-shaped configuration with the apex of the V defining the longitudinal dimension of the second tail section.

It is to be understood that cross-sectional configurations other than an angular V-shape may be utilized. For example, satisfactory results have also been obtained with the use of arcuate U-shaped configurations.

Actual dynamic testing of seaplane floats constructed in accord with the principles set forth above have demonstrated a reduction of taxi distance prior to being airborn on the order of 30%. In fact, reductions of as much as 40% have been obtained. The desirability of such results is immediately apparent. Not only would seaplanes equipped with float constructions of the present invention be of greater safety to the plane's occupants, but also the number of bodies of waters upon which such a plane could land and take off is significantly increased.

The invention accordingly comprises an article of manufacture possessing the features, properties and the relation of elements which will be exemplified in the articles hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a top plan view of a preferred embodiment of the float construction.

FIG. 2 is a side elevational view of the preferred embodiment.

FIG. 3 is a bottom plan view of the preferred embodiment.

FIG. 4 is a front elevational view taken along line 4—4 of FIG. 2.

FIG. 5 is a sectional view taken along line 5—5 of FIG. 2.

FIG. 6 is a sectional view taken along line 6—6 of FIG. 2.

FIG. 7 is a sectional view taken along line 7—7 of FIG. 2.

FIG. 8 is a sectional view taken along line 8—8 of FIG. 2.

Similar reference characters refer to similar parts throughout the several views of the drawings.

DETAILED DESCRIPTION

Figure 9:
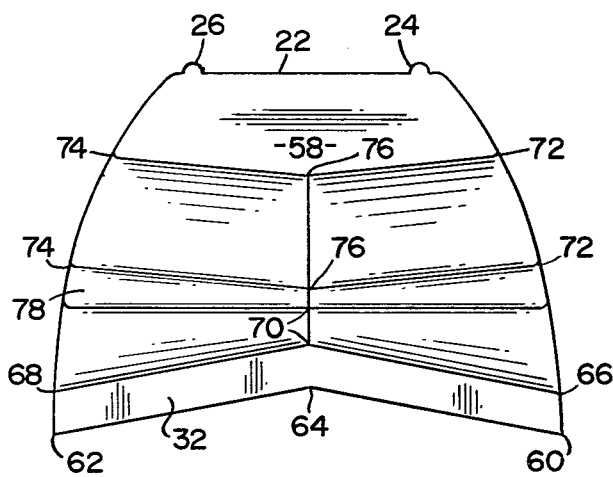
FIG. 9 is a rear elevational view taken along line 9—9 of FIG. 2.

The present invention relates to a float construction of the type primarily intended for use in supporting a seaplane, and a preferred embodiment of the invention is illustrated in the view of FIGS. 1-3 as comprising a main body generally indicated as 20. As best seen in the top plan view of FIG. 1, the top of main body 20 defines a substantially planar top portion 22 extending along the major longitudinal dimension of main body 20. In the preferred embodiment, outboard edges of top portion 22 are defined by a pair of substantially parallel, oppositely disposed lips 24 and 26. Inasmuch as a primary use for the preferred embodiment is in combination with a seaplane, main body 20 further comprises support means shown in phantom at 28 and 30 whereby main body 20 may be attached to the supporting struts of an airplane. As will be described in greater detail below, the broken transverse line in the view of FIG. 1 represents the location of step 32 across the bottom of main body 20.

The position and location of step 32 is more clearly illustrated in the view of FIG. 2. Therein it can be seen that the float of the present invention further comprises a bow 34 extending forwardly of step 32 and, further, that the bottom 36 of bow 34 curves upwardly from step 32 to leading edge 38 of main body 20.

As indicated by the broken line extending along bow 34 in the view of FIG. 2, and as more clearly seen in the front elevation view of FIG. 4, bottom 36 of bow 34 defines a substantially concave V-shaped groove extending inwardly from outboard edges 40 and 42 of bow 34 with the apex 44 of the groove defining the longitudinal midpoint of bow 34. The view of FIG. 5 further illustrates this construction for bow 34.

Inasmuch as it is a cross-sectional view, FIG. 5 further demonstrates a preferred construction for main body 20 wherein a core 46 such as, for example, a foam material, is surrounded by a protective coating means 48 such as, for example, sheet metal or fiberglass.

Attention is now invited to the aft section of main body 20 comprising a tail which, in the illustrated preferred embodiment, comprises a first tail section 50 and a second tail section 52. First tail section 50 is immediately aft of step 32, and second tail section 52 is immediately aft of first tail section 50. As best seen in the view of FIG. 2, bottom 54 of first tail section 50 and bottom 56 of second tail section 52 curve upwardly from step 32 to define trailing edge 58 of main body 20. Attention is now invited to the combined views of FIGS. 2 and 3 wherein the relative configurations of bottom 54 of first tail section 50 and bottom 56 of second tail section 52 are most clearly illustrated. Of course, reference should also be had to the sectional views of FIGS. 6, 7 and 8.

First, with regard to the sectional view of FIG. 6, it can be seen that step 32 corresponds in its configuration to the substantially V-shaped construction of bottom 36 of bow 34. Outboard edges 60 and 62 of step 32 correspond to edges 40 and 42 of bow 34, respectively. Similarly, apex 64 of step 32 corresponds to apex 44.

Extending aft of step 32, and in contiguous relation thereto, is first tail section 50. Bottom 54 of first tail section 50 defines a substantially concave cross-section comprising a substantially V-shaped groove extending inwardly from outboard edges 66 and 68 of first tail section 50 with the apex 70 of the groove defining the longitudinal midpoint of first tail section 50.

As stated above, second tail section 52 is formed on main body 20 immediately aft of and contiguous to first tail section 50. As perhaps best seen in the sectional view of FIG. 8, bottom 56 of second tail section 52 comprises a substantially convex cross-section defining a substantially V-shaped ridge extending inwardly from outboard edges 72 and 74 of second tail section 52 with the apex 76 of the ridge defining the longitudinal midpoint of second tail section 52. In effect, then, it can be seen that the configuration of bottom 54 of first tail section 50 effectively "inverts" to define the preferred configuration for bottom 56 of second tail section 52. With particular regard to the views of FIGS. 3 and 8, it can be seen that in the area designated 78 where this "inversion" takes place, a substantially planar surface is presented.

Figure 10:
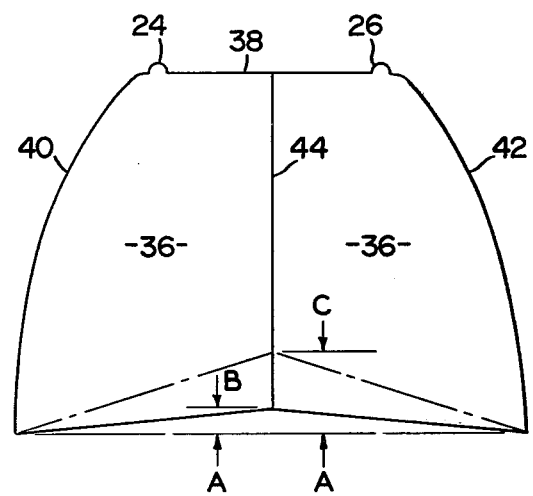
FIG. 10 is a front elevational view similar to that of FIG. 4 illustrating angular orientations of the bottom of the preferred embodiment with regard to horizontal planes indicated by arrows.

In the front elevation view of FIG. 10 it can be seen that the relative depth of the substantially V-shaped configuration of bow 34 becomes more acute as leading edge 38 is approached. This is indicated by reference to first horizontal plane indicated by arrows A, second horizontal plane indicated by arrow B, and third horizontal plane indicated by arrow C. As shown by the angle defined by bottom 36 of bow 34 with either horizontal plane A or B, the V-shaped configuration is relatively shallow in the vicinity of step 32. However, as shown by the angle defined with regard to horizontal plane C, the depth of the V-shaped configuration increases as leading edge 38 is approached. Dynamic testing has revealed that such a construction markedly enhances the performance characteristics of the floats.

Actual dynamic testing of floats constructed in accord with the above description for a preferred embodiment have been conducted. In these dynamic tests a single engine airplane was flown from a body of water using standard, state of the art, floats. The plane was loaded to within 100 pounds of its maximum gross weight, the air temperature was between 85° and 90° F., and there was a head wind of about 10 miles per hour. Then, the same plane was outfitted with the floats constructed according to the present invention. The actual distances required to lift the airplane from the water's surface were compared and it was noted that when the plane was equipped with the floats of the present invention a taxi distance of about 30% less was required. This increased efficiency is directly attributable to the unique construction disclosed herein. It should also be noted that in the preferred embodiment of the invention it is contemplated that floats of about sixteen feet in length will support as much as a 2000 pound displacement and will include a step 32 of approximately 2½ inches. Floats of approximately fourteen feet in length will support up to 1,500 pounds displacement and will comprise a step 32 of about two inches.

Figure 11:
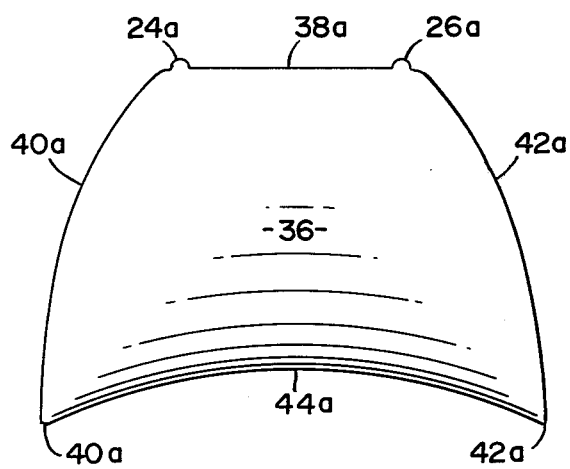
FIG. 11 is a front elevational view similar to that of FIG. 4 illustrating a second embodiment of the float construction.
Figure 12:
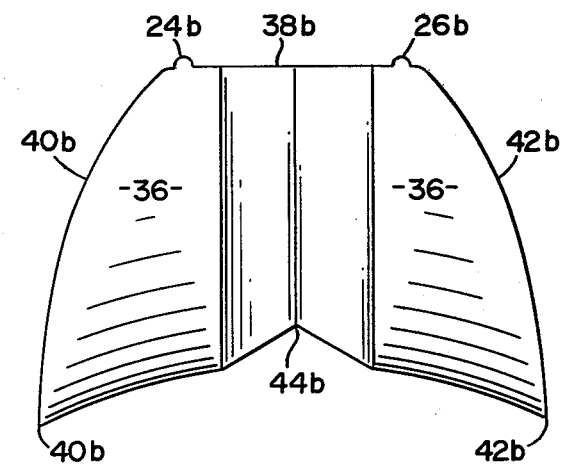
FIG. 12 is a front elevational view similar to that of FIG. 4 illustrating yet another embodiment for the float construction.

Having thus set forth a preferred embodiment for the construction of the floats of this invention, reference is now invited to the views of FIGS. 11 and 12 where two alternative embodiments are disclosed. Inasmuch as the views of FIGS. 11 and 12 generally correspond to the view of FIG. 4, structural elements are identified by identical reference numerals but the letters "a" and "b" have been added to identify second and third embodiments. With specific regard to the view of FIG. 11, it can be seen that the contour of bow 34a has been modified to define a substantially U-shaped configuration. In the embodiment of FIG. 12, the bottom configuration defines substantially parallel arcuate segments along the outboard edges, while the substantially V-shaped configuration has been retained along the longitudinal midpoint of main body 20. Similar configurational modifications could also be made along first tail section 50 and/or second tail section 52.

Figure 13:
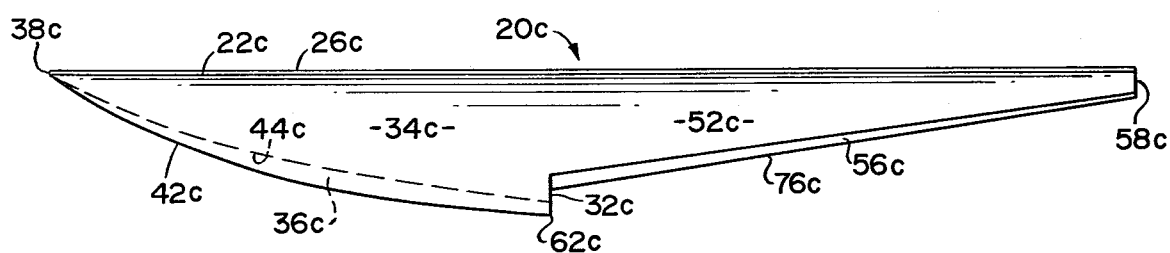
FIG. 13 is a side elevational view of another embodiment of the float construction wherein the tail comprises a single section of substantially convex configuration.

Yet another embodiment for the construction of the floats of this invention is given in the view of FIG. 13. Inasmuch as the view of FIG. 13 generally corresponds to the view of FIG. 2, structural elements are identified by corresponding reference numerals but the letter "c" has been added to identify this additional embodiment. With specific regard to the view of FIG. 13, it can be seen that the primary structural difference resides in the configuration of bottom 56c of tail section 52c. These reference numerals have been utilized for the reason that tail section 52c of the embodiment of FIG. 13 most nearly resembles, in appearance, second tail section 52 of the embodiment shown in FIG. 2. Again with reference to the view of FIG. 13, it can be seen that tail section 52c includes a bottom 56c which defines a substantially convex V-shaped configuration wherein apex 76c defines the longitudinal midpoint of tail section 52c. Floats constructed in accord with the embodiment of FIG. 13 also demonstrate improved performance characteristics, thereby confirming the inventors' premise that a major contribution to the performance of their floats is a result of the construction of bow 34 to define an upwardly curving, inverted V-shaped configuration.

It will thus be seen that the objects set forth above, among those made apparent from the preceding description, are efficiently attained and since certain changes may be made in the above article without departing from the scope of the invention, it is intended that all matter contained in the above description or shown in the accompanying drawings shall be interpretted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A float construction of the type primarily intended for use in supporting a seaplane, said float comprising: a main body defining a major longitudinal dimension; a step extending across the bottom of said main body in substantially transverse relation to said major longitudinal dimension; a bow extending forwardly of said step, said bottom of said main body curving upwardly as it extends forwardly of said step along said bow, said bow defining a simple concave cross-section with regard to said major longitudinal dimension extending inwardly from the outboard edges of said bow with the apex of said cross-section defining the longitudinal midpoint of said bow; and a tail extending rearwardly of said step, said tail comprising a first tail section defining a simple concave cross-section with regard to said major longitudinal dimension and a second tail section defining a simple convex cross-section with regard to said major longitudinal dimension, wherein said first and said second tail sections each define congruent cross-sectional planes at their intersection, said first tail section extending rearwardly from said step and said second tail section extending rearwardly from said first tail section.

2. A float as in claim 1 wherein said bottom of said main body tapers upwardly as it extends rearwardly of said step along said tail.

3. A float as in claim 2 wherein said upward taper is more acute along said first tail section and less acute along said second tail section, both with regard to a horizontal plane corresponding to said major longitudinal dimension.

4. A float as in claim 1 further comprising a substantially planar top portion extending along said main body major longitudinal dimension, whereby said float may be attached to the object it is intended to support.

5. A float as in claim 1 wherein said first tail section concave cross-section defines a substantially V-shaped groove extending inwardly from the outboard edges of said first tail section with the apex of said groove defining the longitudinal midpoint of said first tail section.

6. A float as in claim 1 wherein said second tail section convex cross-section defines a substantially V-shaped ridge extending inwardly from the outboard edges of said second tail section with the apex of said ridge defining the longitudinal midpoint of said second tail section.

7. A float as in claim 1 wherein said first tail section concave cross-section defines a substantially U-shaped groove extending inwardly from the outboard edges of said first tail section with the apex of said groove defining the longitudinal midpoint of said first tail section.

8. A float as in claim 1 wherein said second tail section convex cross-section defines a substantially U-shaped ridge extending inwardly from the outboard edges of said second tail section with the apex of said ridge defining the longitudinal midpoint of said second tail section.

9. A float as in claim 1 further comprising protective coating means disposed in surrounding relation to said main body.

10. A float as in claim 1 wherein said bow cross-section is V-shaped.

11. A float as in claim 1 wherein said bow cross-section is U-shaped.

12. A float as in claim 1 wherein the concavity defined by said bow cross-section is greatest adjacent the leading edge and least adjacent said step of said main body, said concavity decreasing from said leading edge to said step.

* * * * *